(12) United States Patent
Cymbal et al.

(10) Patent No.: US 11,407,439 B2
(45) Date of Patent: Aug. 9, 2022

(54) STEERING SHAFT ASSEMBLY

(71) Applicant: STEERING SOLUTIONS IP HOLDING CORPORATION, Saginaw, MI (US)

(72) Inventors: William D. Cymbal, Freeland, MI (US); Todd L. Mitchell, Alma, MI (US); Tyler J. Talaski, Grand Blanc, MI (US)

(73) Assignee: STEERING SOLUTIONS IP HOLDING CORPORATION, Saginaw, MI (US)

( * ) Notice: Subject to any disclaimer, the term of this patent is extended or adjusted under 35 U.S.C. 154(b) by 444 days.

(21) Appl. No.: 16/377,390

(22) Filed: Apr. 8, 2019

(65) Prior Publication Data

US 2020/0317254 A1    Oct. 8, 2020

(51) Int. Cl.
*B62D 1/20*     (2006.01)
*F16D 1/10*     (2006.01)
*F16C 3/03*     (2006.01)
*F16C 3/035*    (2006.01)

(52) U.S. Cl.
CPC .................. *B62D 1/20* (2013.01); *F16C 3/03* (2013.01); *F16C 3/035* (2013.01); *F16D 1/10* (2013.01); *F16D 2001/103* (2013.01)

(58) Field of Classification Search
CPC ..... B62D 1/20; B62D 1/16; F16C 3/03; F16C 3/035; F16D 1/10; F16D 2001/103; F16D 3/32; F16D 1/0864

USPC .................................................. 464/162, 167
See application file for complete search history.

(56) References Cited

U.S. PATENT DOCUMENTS

| 4,103,514 | A | * | 8/1978 | Grosse-Entrup ........ F16C 3/035 464/167 |
| 4,257,244 | A | * | 3/1981 | Welschof ............. F16C 33/306 464/167 |
| 6,241,616 | B1 | * | 6/2001 | Lightcap ................... F16C 3/03 464/162 |
| 7,347,785 | B2 | * | 3/2008 | Worman, Jr. ........... F16D 3/845 |
| 10,323,692 | B2 | * | 6/2019 | Lentini ..................... F16D 1/10 |
| 2007/0021223 | A1 | * | 1/2007 | Kossack ............... F16C 33/306 464/167 |

FOREIGN PATENT DOCUMENTS

DE    39 40 488 A1 *  6/1991

* cited by examiner

*Primary Examiner* — Greg Binda
(74) *Attorney, Agent, or Firm* — Dickinson Wright PLLC

(57) ABSTRACT

A steering shaft assembly includes a first member having a first member inner surface and a first member outer surface. Each surface extending between a first member first end and a first member second end along an axis. A second member having a second member inner surface and a second member outer surface. Each surface extending between a second member first end and a second member second end along the axis. The first member first end arranged to be received within the second member such that the second member inner surface is disposed about a portion of the first member outer surface. Also included is a shaft extending from a third member. The shaft extending into the first member second end along the axis.

6 Claims, 4 Drawing Sheets

STEERING SHAFT ASSEMBLY

BACKGROUND

Steering assemblies may be provided with a steering shaft such as an intermediate steering shaft that couples upper and lower shaft assemblies. The intermediate steering shaft generally is provided with features to enable adjustment to compensate for angular lash between the intermediate shaft and the upper and lower shaft assemblies and also are axially adjustable to accommodate installation of the intermediate steering shaft between the upper and lower shaft assemblies.

SUMMARY

Disclosed is a steering shaft assembly. The steering shaft assembly includes a first member has a first member inner surface and a first member outer surface. Each surface extends between a first member first end and a first member second end along an axis. A second member that has a second member inner surface and a second member outer surface. Each surface extends between a second member first end and a second member second end along the axis. The first member first end is arranged to be received within the second member such that the second member inner surface is disposed about a portion of the first member outer surface. Also included is a shaft that extends from a third member. The shaft extends into the first member second end along the axis.

Also disclosed is an assembly provided with a steering shaft assembly. The assembly includes a first member that has a first member outer surface that extends between a first member first end and a first member second end along an axis. A second member that has a second member inner surface that extends between a second member first end and a second member second end along the axis. The first member first end is arranged to be received within the second member second end. Also included is a roller element assembly disposed between the first member outer surface and the second member inner surface.

Further disclosed is an assembly provided with a steering shaft assembly. The assembly includes a first member that has a first member inner surface and a first member outer surface. Each surface extends between a first member first end and a first member second end along an axis. The first member outer surface defines a first plurality of splines that extend between the first member first end and the first member second end. A second member has a second member inner surface that extends between a second member first end and a second member second end along the axis. The second member inner surface defines a second plurality of splines that extend from the second member second end towards the second member second end. The first plurality of splines are arranged to meshingly engage the first plurality of splines.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Referring now to the Figures, where the invention will be described with reference to specific embodiments, without limiting same, it is to be understood that the disclosed embodiments are merely examples of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the invention.

Figure 1:
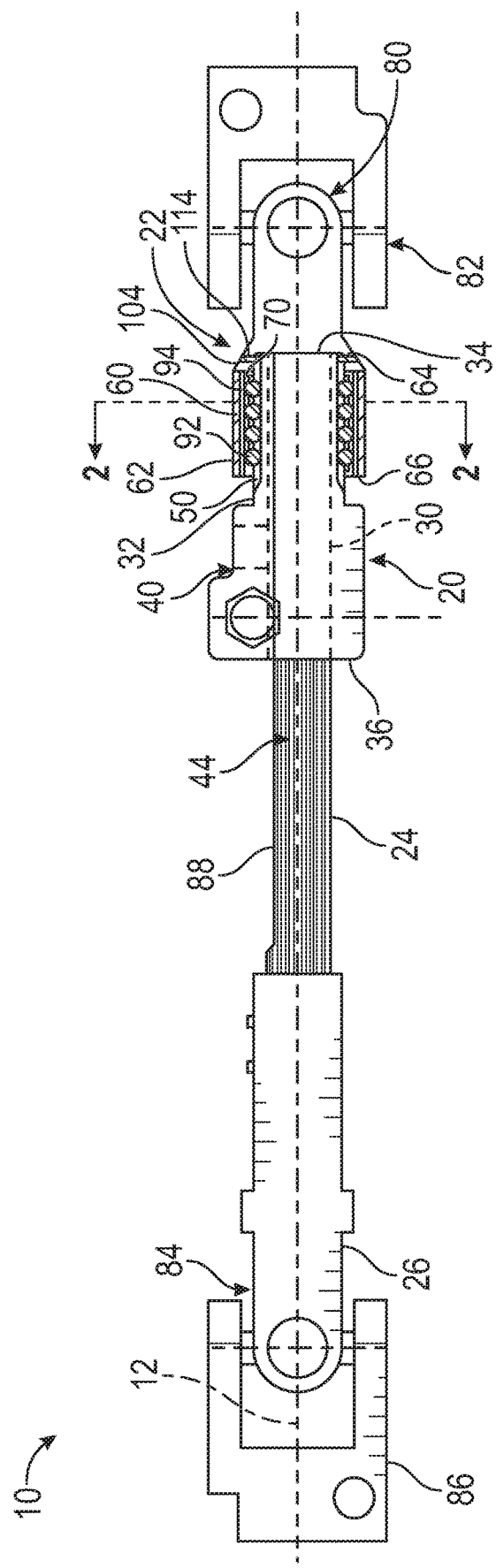
FIG. 1 is a partial section view of a steering shaft assembly.

Referring to FIG. 1, a steering shaft assembly 10 is shown. The steering shaft assembly 10 may be an intermediate steering shaft that interconnects a portion of a steering column and a portion of a steering gear assembly. The steering shaft assembly 10 extends along a steering column axis 12. The steering shaft assembly 10 is arranged to be axially adjustable along the steering column axis 12 to accommodate installation variations between the portion of the steering column and the portion of the steering gear assembly. Furthermore, the steering shaft assembly 10 is arranged to accommodate dynamic movement or dynamic stroking of the steering shaft assembly 10 along the steering column axis 12 during operation of the vehicle within which the steering shaft assembly 10 is installed.

Figure 2:
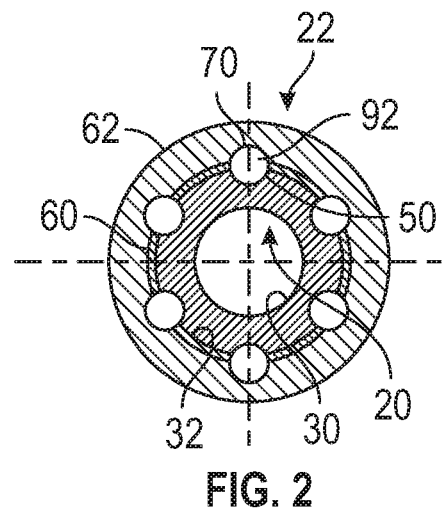
FIG. 2 is a partial section view of the steering shaft assembly.
Figure 3:
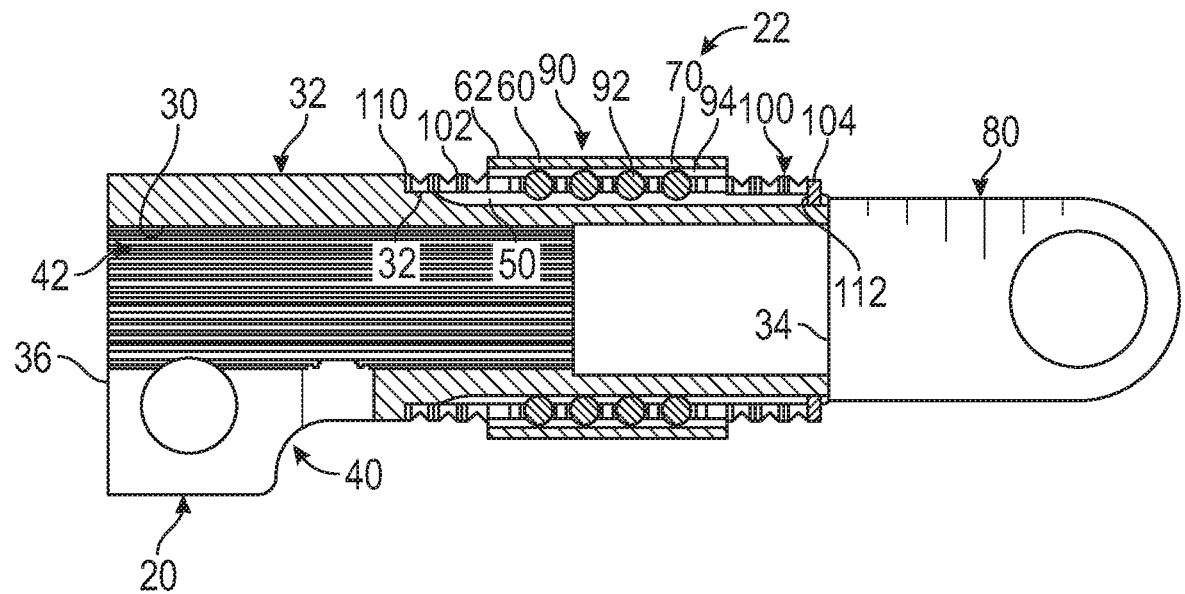
FIG. 3 is a partial section view of a portion of the steering shaft assembly.

Referring to FIGS. 1-3, the steering shaft assembly 10 includes a first member 20, a second member 22 at least partially disposed about the first member 20, and a shaft 24 that extends from a third member 26 and extends at least partially into the first member 20.

The first member 20 includes a first member inner surface 30 and a first member outer surface 32 that is disposed opposite the first member inner surface 30. Each of the first member inner surface 30 and the first member outer surface 32 extends between a first member first end 34 and a first member second end 36 along the steering column axis 12. The first member first end 34 extends into the second member 22.

The first member 20 may be provided with a pinch yoke 40 that is arranged to facilitate the coupling of the first member 20 to the shaft 24. The pinch yoke 40 may be disposed proximate the first member second end 36 or may be disposed between the first member second end 36 and the first member first end 34.

Referring to FIGS. 1 and 3, the first member inner surface 30 defines a spline 42. The spline 42 extends from the first member second end 36 towards the first member first end 34. The spline 42 is arranged to mesh with splines 44 that are defined on the shaft 24 that extends from the third member 26.

Referring to FIGS. 1-3, the first member outer surface 32 defines a first roller element groove 50 that extends from the first member first end 34 towards the first member second end 36.

The second member 22 is at least partially disposed about the first member outer surface 32 of the first member 20. The second member 22 includes a second member inner surface 60 and a second member outer surface 62 that is disposed opposite the second member inner surface 60. Each of the second member inner surface 60 and the second member outer surface 62 extends between a second member first end 64 and a second member second end 66 along the steering column axis 12.

The first member first end 34 is arranged to be received within the second member 22 such that the second member inner surface 60 is at least partially disposed about a portion of the first member outer surface 32. The second member inner surface 60 defines a second roller element groove 70 that extends from the second member second end 66 towards the second member first end 64.

The second member 22 may be provided with a mating yoke 80 that couples the second member 22 to a pinion yoke 82 may be operatively connected to at least a portion of the steering gear assembly.

The shaft 24 extends from the third member 26 that may be provided with a yoke 84 that is coupled to column yoke 86. The shaft 24 extends from the third member 26 along the steering column axis 12 into the first member second end 36. The shaft 24 is a splined shaft having the splines 44. The shaft 24 is provided with a notched region 88 that is disposed between the third member 26 and the second member 22.

Referring to FIGS. 1-5, the steering shaft assembly 10 may be provided with a roller element assembly 90. The roller element assembly 90 is disposed between the first member outer surface 32 and the second member inner surface 60. The roller element assembly 90 is arranged to accommodate a predetermined amount of axial movement of the first member 20 relative to the second member 22 along the steering column axis 12.

The roller element assembly 90 includes at least one roller element 92 and a cage 94. At least one roller element 92 is arranged to be received within the first roller element groove 50 of the first member 20 and within the second roller element groove 70 of the second member 22. The diameter of at least one roller element 92 may be adjusted or selected such that the fitment between the first member 20 and the second member 22 is de-lashed. The cage 94 is disposed between the first member outer surface 32 and the second member inner surface 60. The cage 94 is arranged to receive and retain at least one roller element 92.

The roller element assembly 90 may be retained between the first member 20 and the second member 22 by a first biasing member 100, a second biasing member 102, and a retaining member 104, as shown in FIGS. 1 and 3. The first biasing member 100 is positioned between the first member first end 34 and a first end of the cage 94. The second biasing member 102 is positioned between a second end of the cage and an engagement surface 110 that is defined by the first member 20. The engagement surface 110 being disposed substantially perpendicular to the steering column axis 12. The first biasing member 100 and the second biasing member 102 are arranged as centering springs that position the roller element assembly 90 and/or the first member 20 axially relative to the second member 22.

The retaining member 104 may be received within a first retaining groove 112 that is defined by the first member 20 and within a second retaining groove 114 that is defined by the second member 22, as shown in FIGS. 1 and 2. The first retaining groove 112 is disposed proximate the first member first end 34 and the second retaining groove 114 is disposed proximate the second member first end 64. The retaining member 104 is arranged to retain the roller element assembly 90 between the first member 20 and the second member 22.

Figure 4:
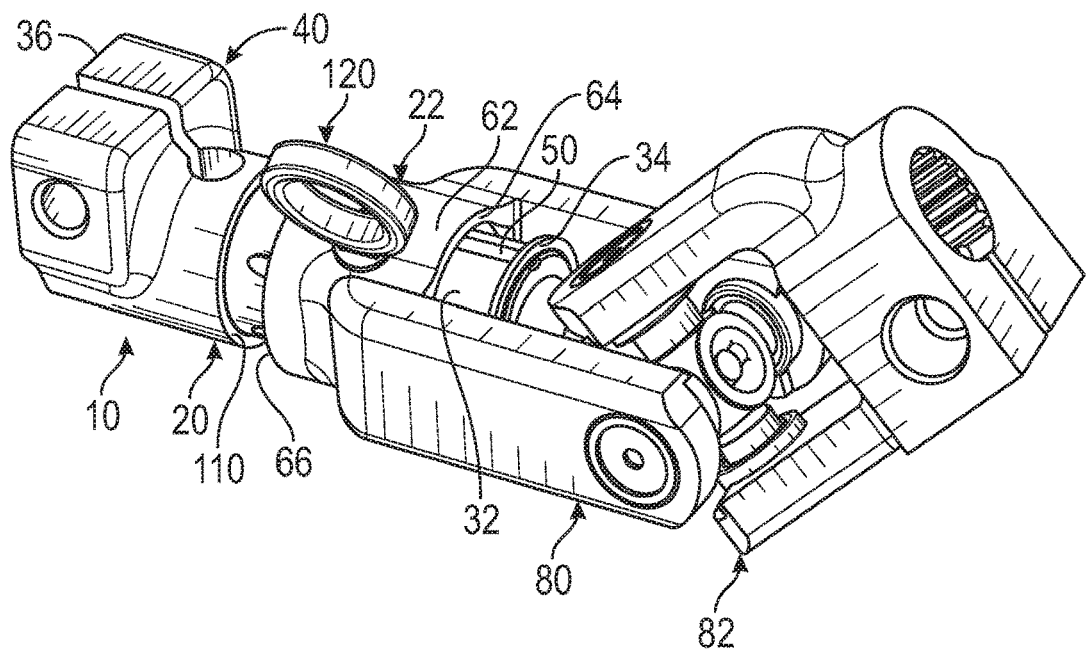
FIG. 4 is a perspective view of the steering shaft assembly.
Figure 5:
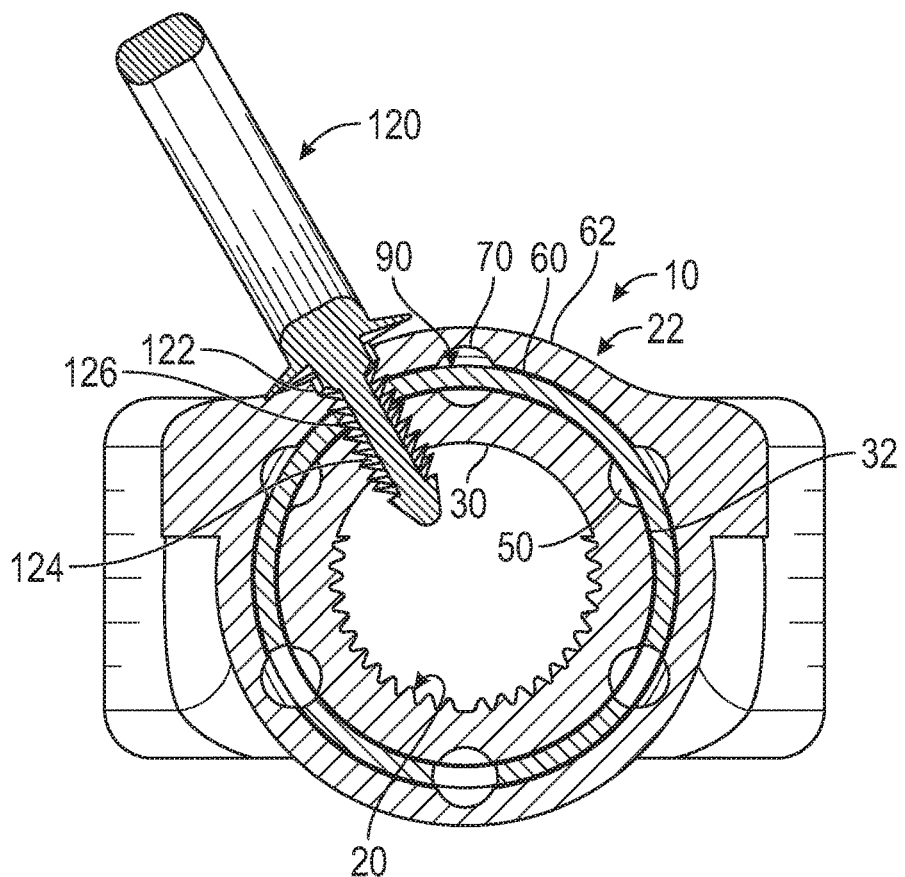
FIG. 5 is a partial section view of the steering shaft assembly of FIG. 4.

Referring to FIGS. 4 and 5, the first member 20, the second member 22, and the roller element assembly 90 may be centered, oriented, or fixed relative to each other by a pin 120 during installation. The pin 120 extends through an opening 122 of the second member 22, another opening 124 of the first member 20, and a cage opening 126 of the cage 94 of the roller element assembly 90. The pin 120 inhibits the roller element assembly 90 from facilitating movement of the first member 20 relative to the second member 22 along or about the steering column axis 12. Removal of the pin 120 enables the roller element assembly 90 to allow the first member 20 to move relative to the second member 22. Should the pin 120 be employed, the first biasing member 100 and the second biasing member 102 may not be employed.

Figure 6:
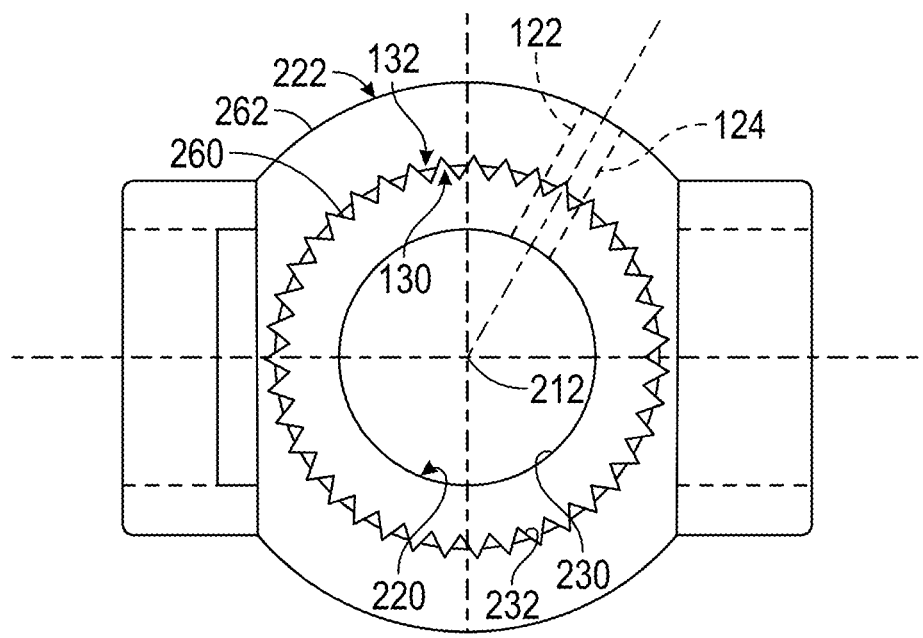
FIGS. 6 and 7 are partial section views of the steering shaft assembly.
Figure 7:
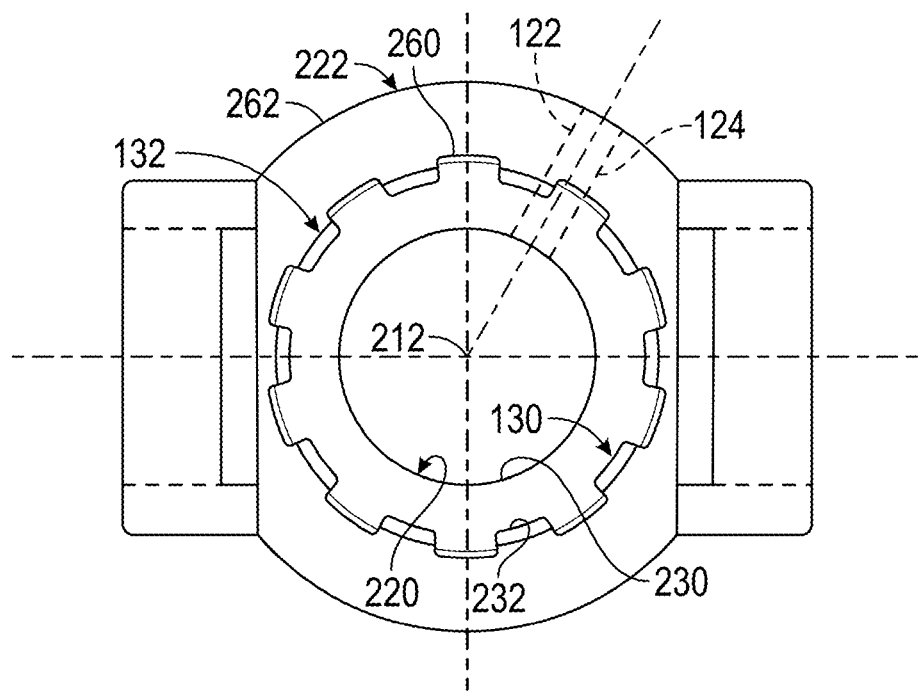

Referring to FIGS. 6 and 7, the steering shaft assembly 10 is illustrated according to another aspect of the invention. In particular, splines may be provided on a first member outer surface 232 and a second member inner surface 260 that are arranged to accommodate a predetermined amount of axial movement of a first member 220 relative to second member 222 along a steering column axis 212, instead of the roller element assembly 90. In such an arrangement, the first member outer surface 232 is provided with a first plurality of splines 130 that extend between a first member first end 234 and a first member second end 236 along the steering column axis 212. A second member inner surface 260 defines a second plurality of splines 132 that extend between a second member first end 264 and a second member second end 266. The first plurality of splines 130 are arranged to mesh with the second plurality of splines 132.

The first plurality of splines 130 and the second plurality of splines 132 may be coated with a low friction coating to provide low friction contact surfaces between the first plurality of splines 130 and the second plurality of splines 132 to facilitate the axial translation of the first member 220 relative to the second member 222 along the steering column axis 212. The first plurality of splines 130 and the second plurality of splines 132 may be provided as triangular teeth, as shown in FIG. 6. The first plurality of splines and the second plurality of splines 132 may be provided as prismatic teeth, as shown in FIG. 7.

The provision of the roller element assembly 90 between the first member 20 and the second member 22 and/or the plurality of splines on the first member 20 and the second member 22 accommodate axial movement between the first member 20 and the second member 22 during operation of the steering shaft assembly 10. Furthermore, this arrangement combines the length adjustment capability of the pinch yoke 40 with the axial dynamics of the roller element assembly 90 and/or the sliding splines.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. A steering shaft assembly, comprising:
   a first member having a first member inner surface and a first member outer surface, each extending between a first member first end and a first member second end along an axis, and
   a second member having a second member inner surface and a second member outer surface, each extending between a second member first end and a second member second end along the axis, the first member first end arranged to be received within the second member such that the second member inner surface is disposed about a portion of the first member outer surface;
   a third member;
   a shaft having a first end extending into the first member second end along the axis and having a second end extending into the third member; and
   a roller element assembly comprising:
   at least one roller element;
   a cage disposed between the first member outer surface and the second member inner surface, the cage arranged to receive and retain the at least one roller element;
   a first biasing member positioned between the first member first end and a first end of the cage; and
   a second biasing member positioned between a second end of the cage and an engagement surface defined by the first member.

2. The steering shaft assembly of claim 1, wherein the roller element assembly is arranged to accommodate a predetermined amount of movement of the first member relative to the second member along the axis.

3. The steering shaft assembly of claim 1, wherein the first member outer surface defines a first roller element groove.

4. The steering shaft assembly of claim 3, wherein the second member inner surface defines a second roller element groove.

5. The steering shaft assembly of claim 1, wherein the first member inner surface defines a spline.

6. The steering shaft assembly of claim 5, wherein the shaft is a splined shaft that meshingly engages with the spline.

* * * * *